April 9, 1957    C. F. GUNDERSON    2,788,500
SATURABLE REACTOR
Filed March 7, 1952

INVENTOR.
CHARLES F. GUNDERSON
BY
Harry M. Saragovitz
Attorney

United States Patent Office 2,788,500
Patented Apr. 9, 1957

2,788,500
SATURABLE REACTOR
Charles F. Gunderson, Belmar, N. J.

Application March 7, 1952, Serial No. 275,446

4 Claims. (Cl. 336—155)

(Granted under Title 35, U. S. Code (1952), sec. 266)

The invention described herein may be manufactured and used by or for the Government for governmental purposes, without the payment of any royalty thereon.

The subject invention is of a saturable reactor and more particularly of a saturable reactor having two coils with non-inductively interacting magnetic fields. Saturable reactors are widely known in the art, and consist of a coil whose inductance is varied by changing the degree of saturation of its magnetic core, the degree of saturation of the core usually being changed by varying the current in another coil whose magnetic core includes all or part of the magnetic core of the first coil. Thus, the current flowing in the second coil can affect the inductance in the first coil.

The saturable reactors generally known in the art consist of a direct current coil for controlling the degrees of saturation of a common core and two alternating current coils. The two alternating current coils are oriented in opposition to each other and are necessary to neutralize the total alternating current flux to avoid inducing an alternating current in the direct current control winding.

It is an object of this invention to provide a saturable reactor having only two coils.

It is a further object of this invention to mechanically orient the coils of a saturable reactor so that the magnetic fields of the alternating current coils will not induce a current in the direct current, controlling coil.

It is a further object of this invention to provide a saturable reactor requiring a minimum amount of ferrous core to produce the desired effect.

It is a further object of this invention to produce a saturable reactor of relatively simple construction and ease of manufacture as well as of light weight for the result produced.

Further objects of this invention will be apparent from the following specification and claims.

Figure 1:
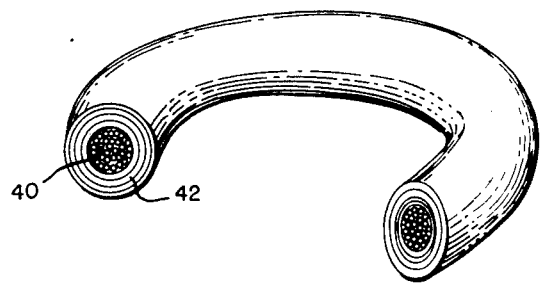
Figure 2:
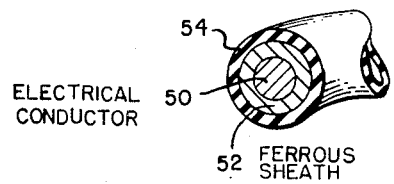
Figure 3:
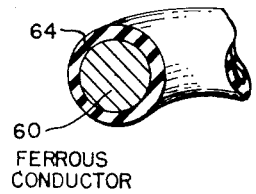

In the drawings, Fig. 1 illustrates a preferred embodiment of this invention and Figs. 2 and 3 illustrate species of this embodiment.

A study of the art shows that the saturation of an iron core in one direction will change its magnetic properties in the other direction, and that this has been applied to a saturable reactor, as seen in the patent to Burgess 743,444, issued November 10, 1903. In this case one coil is encased in ferrous material and the second coil is wound toroidal about the ferrous material. However, this disclosure does not anticipate applicant's invention where the almost prohibitively cumbersome core structure has been eliminated as a mechanical consideration.

In my invention, one or both of the coils themselves are composed of wire of a ferrous material or having at least a thin ferrous sheathing. For example Fig. 2 shows a core 50 of highly conductive material such as copper, silver, or aluminum coated with a ferrous material 52 and having an insulation 54 for the usual electrical reasons. This special wire may be wound in a first coil such as 40 in Fig. 1 with a second coil 42 wound toroidal about the first.

Considering the first coil as consisting of wire having the ferrous coating 52, the flux of the second coil will be in this ferrous coating in a direction along the axis of the conductor of the first coil. If the current in the second coil is direct the flux may be increased until the ferrous sheath 52 of the first coil approaches its magnetic saturation point whereat it is effective as a saturable reactor. The magnetic flux of the current in the conductor 50 will lie in the ferrous sheath 52 perpendicular to the axis of the wire, according to the basic laws of magnetic fields. The important distinction of this structure is that the magnetic fields of the two coils 40 and 42, while lying in the same ferrous core, intersect at substantially right angles so that the magnetic flux of one coil does not cut the conductors of the other and there is no interaction between the coils in the way of induced currents.

The inductance of the alternating current coil will depend on the permeability of the ferrous sheath which can be saturated by the flux of the direct current coil and therefore the inductance of the alternating coil can be controlled by the current in the direct current coil. If coil 40 comprises a wire such as in Fig. 2, the conductor 50 can be energized with direct current until its flux effectively saturates the ferrous material in its sheathing 52, whereas the flux of an alternating current in coil 42 will encounter a less permeable core since the ferrous material 52, now considered a part of the coil 40, appears as a core to coil 42 and the inductance of coil 42 can be varied by the direct current in coil 40.

The core material 52 about the conductor 50 should be relatively thin compared with the cross sectional area of the conductor 50 since the actual flux produced by the conductor 50 per unit length in one coil will be relatively minute compared with the flux induced by the windings of the other coil, and the allowable heat dissipation would limit the amount of current that could be driven thru the conductor 50.

Both of the coils 40 and 42 in the saturable reactor can be wound of the special wire to further extend the degree of effectiveness of the saturation characteristics of the reactor. For instance, if the outer core 42 is carrying the direct current it will first have to saturate its own ferrous structure before it begins to saturate the iron around the conductor of the coil 40, and, until its own sheath is saturated, it will act in the flux path of, and effect the inductance of the inner coil 40. Thus, for a small alternating current, the direct current can be increased to a level that will affect the iron in the inner core 40 so that even the small alternating current in coil 40 will be operating at the correct point on the saturation curve of the iron in its core, whereas, if the alternating current is relatively strong, the direct current can be decreased so that the alternating current first has to overcome the inductance of its own coating before it encounters the coating of toroidal wound coil 42 which also acts as a core and which is operating near the saturation point of its magnetic curve. This will render the saturable reactor operable over a wide range of alternating and direct currents.

This saturable reactor will have a high efficiency compared with conventional, laminated structure since the ferrous coating is supported by the wire and can be thinner than in conventional, laminate practice. This will reduce the hysteresis and eddy-current losses to a considerable degree as well as reducing the amount of iron required to produce a given effect in a coil of a certain dimension. It is also apparent that, compared with the structure that is found in almost all conventional saturable reactors of the toroidal type, this saturable reactor has eliminated one coil and two separate and difficult-toroidal windings.

The conventional saturable reactor has two identical alternating current toroids secured axially together with the direct current coil wound toroidially about the two of them. This structure is relatively more effective than the older, stack mounted laminate structures but neither can compare with the simplicity of applicant's structure with only one toroidal windings.

The species of Fig. 3 utilizes a ferrous conductor 60 with the necessary insulating layer 64. The magnetic field of the current in the wire 60 meets the permeability of its own medium and this produces the relatively high inductance of iron wire to alternating currents. However, if this iron wire is saturated by the current in the second coil its inherent inductance will be changed and thereby controlled. If the resistance of the wire is not an appreciable factor the saturable reactor of this species would be extremely simple to construct and very effective.

It will be obvious to those skilled in the art that a considerable number of inductive and saturable effects can be produced by varying: the ratio of the ferrous sheathing to the conductor in either or both of the coil-core elements of this reactor; the types of conductors used; the magnetic characteristics of the ferrous sheathing, the ratio of turns in the two coils and their overall dimensions.

I claim:
1. In a saturable reactor a first coil of wire, said wire having a center core of electrically highly conductive non-magnetic metal surrounded by a layer of ferrous material and encompassed by a layer of electrical insulation and a second coil of similar wire wound toroidally about said first coil.

2. In a saturable reactor as in claim 1, the thickness of said ferrous layer being a small fraction of the diameter of said center core of electrically highly conductive metal.

3. In a saturable reactor as in claim 1, said layer of ferrous material consisting of a ferrous plating.

4. In a saturable reactor as in claim 1, said layer of ferrous material consisting of a powdered ferrous coating.

References Cited in the file of this patent

UNITED STATES PATENTS

| | | |
|---|---|---|
| 1,287,982 | Hartley | Dec. 17, 1918 |
| 1,289,418 | Elmen | Dec. 31, 1918 |
| 1,561,782 | Given | Nov. 17, 1925 |
| 1,605,557 | Osnos | Nov. 2, 1926 |
| 2,716,736 | Rex | Aug. 30, 1955 |

FOREIGN PATENTS

| | | |
|---|---|---|
| 188,554 | Switzerland | Apr. 1, 1937 |